(12) United States Patent
Tanaka

(10) Patent No.: US 7,716,924 B2
(45) Date of Patent: May 18, 2010

(54) DEVICE FOR PURIFYING EXHAUST GAS OF AN INTERNAL COMBUSTION ENGINE

(75) Inventor: Hiroshi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 605 days.

(21) Appl. No.: 11/630,002

(22) PCT Filed: Jun. 23, 2005

(86) PCT No.: PCT/JP2005/012014
§ 371 (c)(1),
(2), (4) Date: Dec. 19, 2006

(87) PCT Pub. No.: WO2006/001495
PCT Pub. Date: Jan. 5, 2006

(65) Prior Publication Data
US 2008/0041044 A1 Feb. 21, 2008

(30) Foreign Application Priority Data
Jun. 25, 2004 (JP) .............................. 2004-188138

(51) Int. Cl.
*F01N 3/00* (2006.01)
(52) U.S. Cl. .............................. 60/301; 60/280; 60/285; 60/297
(58) Field of Classification Search ................ 60/280, 60/285, 286, 297, 301
See application file for complete search history.

(56) References Cited
U.S. PATENT DOCUMENTS
6,619,035 B2 * 9/2003 Matsuoka et al. ............. 60/286

| | | | |
|---|---|---|---|
| 6,681,564 B2 * | 1/2004 | Nishiyama et al. ............. | 60/285 |
| 6,866,610 B2 * | 3/2005 | Ito .............................. | 477/43 |
| 6,981,369 B2 * | 1/2006 | Miura .......................... | 60/285 |
| 7,246,485 B2 * | 7/2007 | Ohki et al. ..................... | 60/285 |
| 7,395,658 B2 * | 7/2008 | Sunohara et al. .............. | 60/277 |

FOREIGN PATENT DOCUMENTS

| | | |
|---|---|---|
| JP | A 11-210525 | 8/1999 |
| JP | A 11-351041 | 12/1999 |
| JP | A 11-351042 | 12/1999 |

(Continued)

*Primary Examiner*—Binh Q. Tran
(74) *Attorney, Agent, or Firm*—Oliff & Berridge, PLC

(57) ABSTRACT

A NOx occluding and reducing catalyst 7 is arranged in the exhaust gas passage 2 of a lean burn engine 1. When the engine 1 is in operation at a lean air-fuel ratio, the operating air-fuel ratio is changed over to a rich air-fuel ratio for a short period of time to execute the rich spike operation for reducing and purifying the NOx occluded in the NOx occluding and reducing catalyst. At the time of the rich spike operation during the lean burn operation being supercharged by a supercharger 45 provided in the intake air passage 4, an electronic control unit 30 of the engine so sets the richness degree of the engine operating air-fuel ratio as to decrease with an increase in the supercharged pressure. This prevents the HC and CO components from flowing out in large amounts to the downstream of the catalyst 7 due to blow-by, and prevents a decrease in the NOx reduction efficiency of the NOx occluding and reducing catalyst.

24 Claims, 6 Drawing Sheets

FOREIGN PATENT DOCUMENTS

| | | |
|---|---|---|
| JP | A 2002-38925 | 2/2002 |
| JP | A 2002-130008 | 5/2002 |
| JP | A 2002-364412 | 12/2002 |
| JP | A 2003-56379 | 2/2003 |
| JP | A 2004-176675 | 6/2004 |

* cited by examiner

DEVICE FOR PURIFYING EXHAUST GAS OF AN INTERNAL COMBUSTION ENGINE

TECHNICAL FIELD

The present invention relates to a device for purifying exhaust gas of an internal combustion engine. More specifically, the invention relates to a device for purifying exhaust gas of a lean burn engine that operates at an air-fuel ratio leaner than the stoichiometric air-fuel ratio.

BACKGROUND ART

An NOx occluding and reducing catalyst has been known which occludes nitrogen oxides (NOx) in the exhaust gas by absorption or adsorption when the air-fuel ratio of the exhaust gas flowing in is lean, and reduces and purifies the NOx which it has occluded with a reducing component such as CO or HC component in the exhaust gas when the air-fuel ratio of the exhaust gas has turned into the stoichiometric air-fuel ratio or a rich air-fuel ratio. When the NOx occluding and reducing catalyst is used for purifying the exhaust gas, it becomes necessary to conduct the operation at a rich air-fuel ratio by changing the operating air-fuel ratio over to a rich air-fuel ratio for a short period of time every time when the amount of NOx occluded in the NOx occluding and reducing catalyst has increased during the operation at a lean air-fuel ratio, to thereby execute a rich spike operation for reducing and purifying NOx occluded by the catalyst by supplying the exhaust gas of a rich air-fuel ratio to the NOx occluding and reducing catalyst.

However, the rich spike operation is accompanied by the operation for changing the operating air-fuel ratio from a lean air-fuel ratio over to a rich air-fuel ratio by increasing the amount of supplying the fuel into the engine for a short period of time. Therefore, if the rich spike operation is executed for unnecessarily long periods of time or too frequently, the fuel is consumed in increased amounts by the engine and this causes a problem in that excess of HC and CO components that were not used for reducing and purifying NOx are released into the air.

Therefore, it becomes necessary to efficiently execute the rich spike operation for the NOx occluding and reducing catalyst. A device for purifying exhaust gases taught in, for example, JP-A-2003-56379 utilizes the output of an air-fuel ratio sensor provided in an exhaust gas passage downstream of the NOx occluding and reducing catalyst in order to efficiently execute the rich spike operation for the NOx occluding and reducing catalyst.

That is, according to the device disclosed in JP-A-2003-56379, the air-fuel ratio sensor is provided in the exhaust gas passage downstream of the NOx occluding and reducing catalyst to detect the air-fuel ratio of the exhaust gas, and the rich spike operation is terminated when the output of the air-fuel ratio sensor has changed from a value corresponding to a lean air-fuel ratio near the stoichiometric air-fuel ratio over to a value corresponding to a rich air-fuel ratio during the rich spike operation.

When the exhaust gas of a rich air-fuel ratio is supplied to the NOx occluding and reducing catalyst during the rich spike operation, NOx that is occluded reacts with HC and CO components in the exhaust gas on the NOx occluding and reducing catalyst, whereby HC and CO components rob NOx of oxygen to reduce NOx. Therefore, while the reaction for reducing NOx is taking place on the NOx occluding and reducing catalyst, HC and CO components in the exhaust gas are oxidized on the NOx occluding and reducing catalyst, and the air-fuel ratio of the exhaust gas from the NOx occluding and reducing catalyst acquires a stoichiometric air-fuel ratio (actually, an air-fuel ratio slightly leaner than the stoichiometric air-fuel ratio).

On the other hand, when NOx occluded in the NOx occluding and reducing catalyst is all reduced, HC and CO components in the exhaust gas are no longer oxidized on the NOx occluding and reducing catalyst, and the air-fuel ratio of the exhaust gas from the NOx occluding and reducing catalyst quickly changes over to the side of the rich air-fuel ratio.

According to the device taught in JP-A-2003-56379, the rich spike operation is terminated when the output of the air-fuel ratio sensor on the downstream side becomes a predetermined judging value during the rich spike operation, and the judging value is varied in accordance with the operating conditions of the engine to optimize the moment for terminating the rich spike operation in accordance with the operating conditions of the engine.

In recent years, there has been used an engine equipped with a supercharger (so-called supercharged lean burn engine) which effects the supercharging even in the operation at a lean air-fuel ratio. In the supercharged lean burn engine, the supercharging is effected during the operation at a lean air-fuel ratio and the cylinders are filled with much air. Upon conducting the supercharged lean burn operation, therefore, it is allowed to maintain a lean air-fuel ratio while increasing the engine output by supplying fuel in an increased amount to the engine, making it possible to expand the region of lean air-fuel ratio up to a high-load region where the operation could not be conducted at a lean air-fuel ratio with conventional naturally-aspirated engines.

In the case of the supercharged lean burn engine, however, the amounts of air filled in the cylinders due to supercharging become large causing a problem at the time of executing the rich spike operation for the NOx occluding and reducing catalyst.

In the supercharged lean burn engine, for example, the amounts of air filled in the cylinders are larger than those of the naturally aspirated engines and, therefore, the amounts of exhaust gas increase. Therefore, the SV value (space velocity value) through the catalyst increases correspondingly, and some of the HC and CO components in the exhaust gas flow out to the downstream of the catalyst in increased amounts without reacting with the NOx on the catalyst; i.e., the so-called "blow-by" takes place.

When the "blow-by" takes place as described above, the NOx occluding and reducing catalyst becomes no longer capable of effectively utilizing the HC and CO components in the exhaust gas for the reduction of NOx, and it becomes difficult to efficiently reduce the NOx.

Further, when the moment of terminating the rich spike operation is judged based on the output of the air-fuel ratio sensor downstream of the catalyst as in the device of the above JP-A-2003-56379, the HC and CO components arrive at the air-fuel ratio sensor in relatively large amounts due to blow-by even though the reduction of NOx has not actually been completed on the NOx occluding and reducing catalyst, and the air-fuel ratio that is detected often reaches a judging value.

In this case, the rich spike operation terminates before the NOx occluded in the NOx occluding and reducing catalyst is all reduced and purified. Therefore, the operation at a lean air-fuel ratio is resumed again in a state where the NOx occluding and reducing catalyst is still occluding the NOx in relatively large amounts and this causes a problem of a decrease in the NOx occluding capability of the NOx occluding and reducing catalyst.

In the supercharged lean burn engine, further, the amounts of air in the cylinders are large during the operation at a lean air-fuel ratio, and the fuel must be supplied in increased amounts for conducting the operation at a rich air-fuel ratio.

On the other hand, the rich spike operation usually starts when the amount of NOx occluded in the NOx occluding and reducing catalyst reaches a predetermined value. Therefore, the amounts of HC and CO required for reducing all of the occluded NOx become nearly constant.

The rich spike operation terminates at a moment when the HC and CO components are supplied in the above-mentioned amounts to the NOx occluding and reducing catalyst, while the amounts of HC and CO components used for reducing the NOx in the exhaust gas are determined depending upon the air-fuel ratio of the exhaust gas. That is, if an air-fuel ratio of the exhaust gas is defined as the ratio of the amount of the air taken in by the engine to the amount of the fuel supplied to the engine, then, a difference between the stoichiometric air-fuel ratio and the air-fuel ratio of the exhaust gas during the rich spiking (hereinafter called "richness degree") varies in proportion to the concentration of excess of HC and CO components in the exhaust gas (amounts of the HC and CO components contained in the exhaust gas without burning).

Therefore, the amounts of HC and CO that can be used for reducing the NOx during the rich spiking, as a whole, become a value obtained by multiplying the richness degree of air-fuel ratio during the rich spike operation (difference between the stoichiometric air-fuel ratio and the air-fuel ratio during the rich spike operation) by the flow rate of the exhaust gas.

During the supercharged lean burn operation as described above, the flow rate of exhaust gas of the engine becomes considerably large. The total amount of the HC and CO components necessary for reducing the NOx occluded in the NOx occluding and reducing catalyst, on the other hand, remains nearly constant.

In the supercharged lean burn engine, therefore, the time for sustaining the rich spike operation that is required becomes much shorter than that in the case of the naturally-aspirated engine.

In the supercharged lean burn engine in practice, however, the flow rate of the exhaust gas is large, the SV value through the NOx occluding and reducing catalyst is high and, therefore, the HC and CO components in the exhaust gas cannot be efficiently used. Accordingly, the time for sustaining the rich spike operation that is really required becomes considerably longer than the time that is usually required and, this causes a decrease in the fuel efficiency of the engine.

When the NOx occluding and reducing catalyst is used for the device for purifying exhaust gases of the supercharged lean burn engines, execution of the rich spike operation in a traditional manner causes a problem of decrease in the NOx reduction efficiency.

In the foregoing was described the case of the supercharged lean burn engine. However, in the case of the naturally aspirated lean burn engine, too, though the intensity of the problem may be different, the problem of blow-by occurs when the amount of the air taken in increases and a problem of a decrease in the NOx reduction efficiency during the rich spike operation occurs.

DISCLOSURE OF THE INVENTION

In view of the above-mentioned problems, it is an object of the present invention to provide a device for purifying exhaust gas of an internal combustion engine capable of preventing a decrease in the NOx reduction efficiency during the rich spike operation when the NOx occluding and reducing catalyst is used for the device for purifying exhaust gases of a lean burn engine.

According to the present invention, there is provided a device for purifying exhaust gas of an internal combustion engine which is equipped with a supercharger and effects the supercharging in the operation at a lean air-fuel ratio, comprising:

a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;

wherein when the engine is in operation at a lean air-fuel ratio, a rich spike operation is executed by changing the engine operating air-fuel ratio over to a rich air-fuel ratio for a short period of time to supply the exhaust gas of the rich air-fuel ratio to the NOx occluding and reducing catalyst, in order to reduce and purify the NOx occluded in the NOx occluding and reducing catalyst; and wherein the richness degree of the engine operating air-fuel ratio is varied in accordance with the supercharged pressure of the engine.

That is, in the present invention, when the rich spike operation is being executed for the supercharged lean burn engine, the richness degree of the operating air-fuel ratio is varied in accordance with the supercharged pressure.

In the supercharged lean burn engine, the amount of the air taken in by the cylinders increases with an increase in the supercharged pressure and, therefore, the flow rate of exhaust gas increases in accordance with the supercharged pressure.

In this case, if the richness degree of the operating air-fuel ratio (difference between the stoichiometric air-fuel ratio and the operating air-fuel ratio) during the rich spike operation is maintained to be the same as that of when the flow rate of exhaust gas is small, the rich spike operation cannot be efficiently executed as described above and, therefore, a problem of a decrease in the NOx reduction efficiency of the NOx occluding and reducing catalyst occurs when the rich spike operation is executed.

In the invention of claims 1 to 3, the above-mentioned problems are solved by varying the richness degree of the operating air-fuel ratio in accordance with the supercharged pressure during the rich spike operation.

When the supercharged pressure is high (i.e., when the flow rate of the exhaust gas is large), the above-mentioned blow-by takes place, and the HC and CO components flow out in increased amounts to the downstream of the catalyst without being used for reducing the NOx on the NOx occluding and reducing catalyst, causing the NOx purifying efficiency to decrease. In this case, for example, even if the richness degree of the operating air-fuel ratio (air-fuel ratio of the exhaust gas) is decreased, the amount of the HC and CO components used for purifying the NOx on the NOx occluding and reducing catalyst does not change much, accounting for a decrease in the amounts of HC and CO components that wastefully flow to the downstream of the catalyst due to blow-by.

Therefore, the HC and CO components in the exhaust gas pass in decreased amounts through the catalyst without being used for reducing the NOx, preventing a decrease in the NOx reduction efficiency of the NOx occluding and reducing catalyst. Further, the HC and CO components flow out in decreased amounts to the downstream of the catalyst due to blow-by, and the concentrations of HC and CO components in the exhaust gas decrease on the downstream of the catalyst during the rich spike operation. Accordingly, even when the moment of terminating the rich spike operation is judged relying upon the output of the air-fuel ratio sensor on the downstream side, a rich air-fuel ratio is not erroneously detected before the NOx occluded by the catalyst is all reduced.

In the present invention, when the rich spike operation is executed, the richness degree of the air-fuel ratio is varied in accordance with the supercharged pressure of the engine even during the rich spike operation. In general, however, the duration of the rich spike operation is short. Therefore, the richness degree of the air-fuel ratio during the rich spike operation can be set in accordance with the supercharged pressure of the engine at the start of the rich spike operation, and the richness degree of the air-fuel ratio during the rich spike operation may be maintained at (fixed to) the richness degree that is set as described above.

In a region where the flow rate of exhaust gas is small, the space velocity is low through the catalyst. Therefore, blow-by does not take place even when the richness degree of the air-fuel ratio is increased. Hence, the operation for varying the richness degree of the air-fuel ratio in accordance with the supercharging pressure may be conducted in only a region where the supercharged pressure is not smaller than a given value.

In an engine equipped with both a direct injector and a port injector, it is desired that the fuel is injected from the port injector only during the rich spike operation. The direct injector injects the fuel directly into the cylinder. When the amount of fuel injection is to be considerably increased such as during the rich spike operation, therefore, the fuel is not atomized to a sufficient degree, and unburned HC component increases in the exhaust gas.

The port injector, on the other hand, offers an ample time for the fuel to be atomized and diffused, and does not cause an increase in the amount of the unburned HC components in the exhaust gas even when the fuel is injected in relatively large amounts.

When injected from the port injector, however, a port-wet phenomenon takes place in which the fuel that is injected partly adheres on the wall surface of the intake port. The amount of fuel that adheres on the wall surface due to port-wet phenomenon increases with an increase in the amount of fuel injection. In a highly supercharged region where the fuel is required in large amounts in order to change the operating air-fuel ratio into a rich air-fuel ratio, therefore, the amount of the fuel that adheres on the wall surface within the total amount of the fuel injected from the port injector at the time of rich spike operation increases. This deteriorates the response of change in the air-fuel ratio.

The port-wet phenomenon occurs less during the intake-synchronous injection which injects the fuel into the intake port in a state where there is an intake stream while the intake valve is opened than during the intake-asynchronous injection which injects the fuel into the intake port while the intake valve is closed. Therefore, the fuel is injected from the port injector during the rich spike operation, and the asynchronous injection is changed over to the synchronous injection when the supercharged pressure has become higher than a predetermined change-over value to prevent deterioration in the response of change in the air-fuel ratio in the highly supercharged pressure region (region where the amount of the air taken in is large) where the port-wet phenomenon occurs easily.

In the above example, the supercharged pressure is used as an index to represent the flow rate of the exhaust gas (space velocity through the catalyst) to vary the richness degree during the rich spike operation. Instead of using the supercharged pressure, however, the amount of the air taken in may be used as an index to represent the flow rate of the exhaust gas to vary the richness degree in accordance with the amount of the air taken in. In this case, the richness degree is varied in accordance with the amount of the air taken in making it possible to set the richness degree of the air-fuel ratio which correctly corresponds to the flow rate of the exhaust gas and, therefore, to more effectively prevent a decrease in the NOx reduction efficiency.

In the foregoing was described the case of a lean burn engine equipped with the supercharger. The invention, however, can also be applied even for naturally aspirated lean burn engines without the supercharger.

Namely, in the naturally-aspirated lean burn engine, too, a decrease in the NOx reduction efficiency can be prevented by varying the richness degree of the air-fuel ratio during the rich spike operation in accordance with the flow rate of the exhaust gas or in accordance with an index (e.g., amount of the air taken in, amount of the air filled in the cylinder or intake air pressure) that represents the flow rate of the exhaust gas, or by setting the richness degree of the air-fuel ratio during the rich spike operation in accordance with the above indexes at the start of the rich spike operation.

BEST MODE FOR CARRYING OUT THE INVENTION

An embodiment of the invention will now be described with reference to the accompanying drawings.

Figure 1:
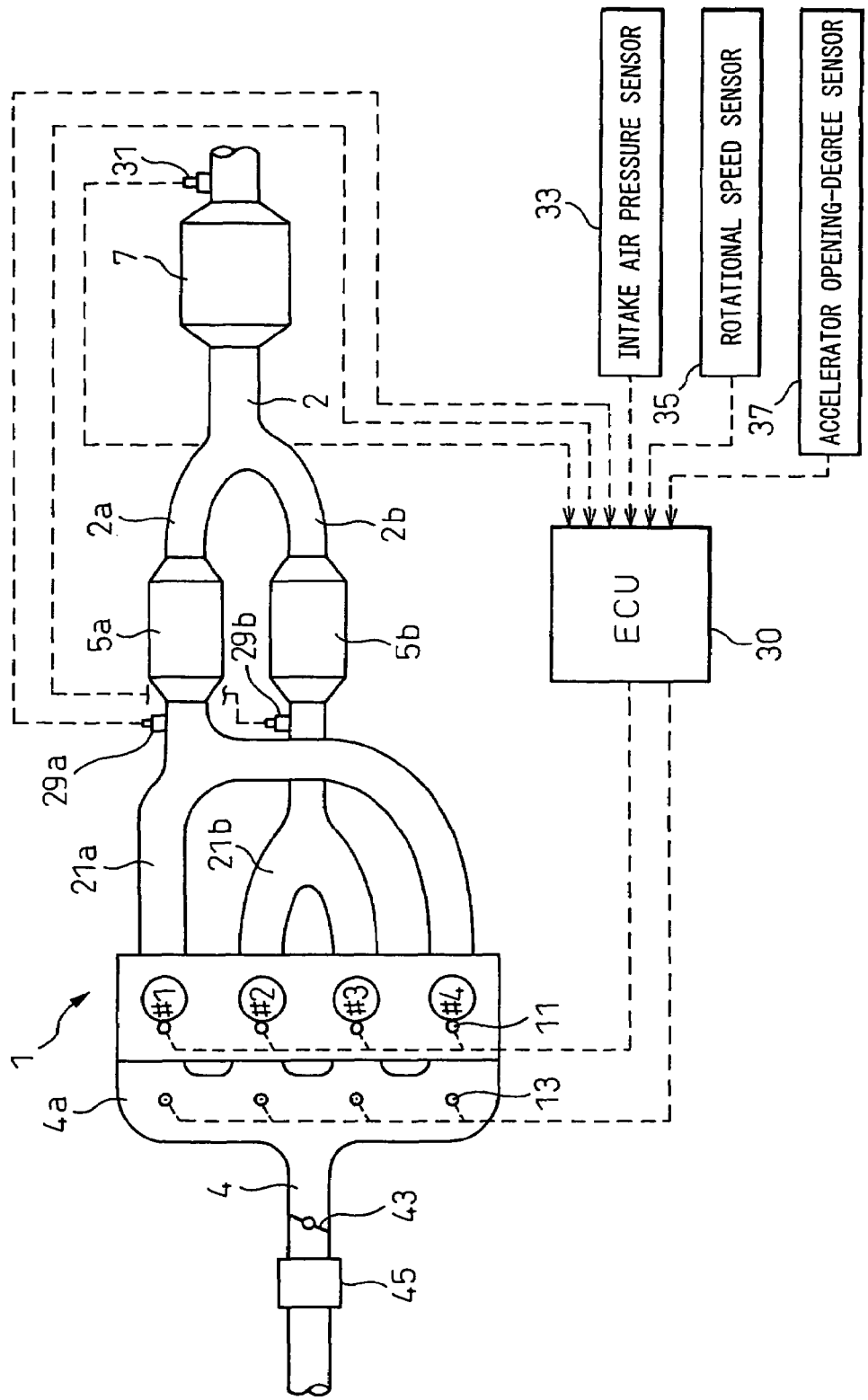
FIG. 1 is a diagram schematically illustrating the constitution of an embodiment of the present invention when it is applied to an internal combustion engine for automobiles.

FIG. 1 is a diagram schematically illustrating the constitution of an embodiment of when the invention is applied to an internal combustion engine for automobiles.

In FIG. 1, reference numeral 1 denotes an internal combustion engine for automobiles. In this embodiment, the engine 1 is a four-cylinder gasoline engine having four cylinders #1 to #4. As will be described later, the internal combustion engine 1 of this embodiment is a lean burn engine that can be operated at an air-fuel ratio which is higher (leaner) than the stoichiometric air-fuel ratio.

In this embodiment, the cylinders #1 to #4 are divided into two cylinder groups each including two cylinders so that the ignition timings will not take place consecutively (in the embodiment of FIG. 1, for example, the cylinders are ignited in order of 1-3-4-2, the cylinders #1, #4 and the cylinders #2, #3 constituting their respective cylinder groups). Further, the exhaust ports of the cylinders are connected to an exhaust manifold depending upon the cylinder groups, and are connected to an exhaust gas passage depending upon the cylinder groups.

In FIG. 1, reference numeral 21a denotes an exhaust manifold for connecting exhaust ports of the cylinder group of the cylinders #1 and #4 to a separate exhaust gas passage 2a, and 21b denotes an exhaust manifold for connecting exhaust ports of the cylinder group of the cylinders #2 and #3 to a separate exhaust gas passage 2b. In this embodiment, start catalysts (hereinafter called "SCs") 5a and 5b comprising three-way catalytic converters are arranged in the separate exhaust gas passages 2a and 2b. The separate exhaust gas passages 2a and 2b meet together in a common exhaust gas passage 2 on the downstream of the SCs.

A NOx occluding and reducing catalyst 7 that will be described later is arranged in the common exhaust gas passage 2. In FIG. 1, reference numerals 29a and 29b denote upstream air-fuel ratio sensors arranged in the separate exhaust gas passages 2a, 2b on the upstream of the start catalysts 5a, 5b, and reference numeral 31 denotes a downstream air-fuel ratio sensor arranged in the exhaust gas passage 2 at the outlet of the NOx occluding and reducing catalyst 7. In this embodiment, the air-fuel ratio sensors 29a, 29b and 31 are so-called linear air-fuel ratio sensors that produce voltage signals corresponding to the exhaust gas air-fuel ratio over a wide range of air-fuel ratios. Instead of using the linear air-fuel ratio sensors, however, it is also allowable to use $O_2$ sensors having so-called Z-type output characteristics which detect the oxygen concentration in the exhaust gas and of which the outputs sharply change with the stoichiometric air-fuel ratio as a boundary.

In FIG. 1, reference numeral 4a denotes an intake manifold that connects the intake ports of the cylinders of the engine to an intake air passage 4.

In FIG. 1, reference numeral 43 denotes a throttle valve for adjusting the amount of the air taken in by the engine 1, and 45 denotes a supercharger such as a turbo charger for pressurizing the intake air.

In this embodiment, further, the cylinders #1 to #4 are each provided with a direct injector 11 for directly injecting the fuel into the cylinder and a port injector 13 for injecting the fuel into the intake port of the cylinder.

In FIG. 1, further, reference numeral 30 denotes an electronic control unit (ECU) of the engine 1. The ECU 30 in this embodiment is a microcomputer of a known constitution including RAM, ROM and CPU, and executes fundamental controls such as ignition timing control and fuel injection control of the engine 1. In this embodiment, further, in addition to the above fundamental controls, the ECU 30 works to increase the amount of fuel injection into the engine during the operation at a lean air-fuel ratio in accordance with a state where NOx is occluded in the NOx occluding and reducing catalyst 7 to operate the engine at a rich air-fuel ratio for a short period of time, executes the rich spike operation for releasing the occluded NOx from the NOx occluding and reducing catalyst 7, and to vary the richness degree of the engine operating air-fuel ratio during the rich spike operation in accordance with the amount of the air taken in by the engine 1.

In order to execute these controls, the ECU 30 receives, through its input ports, a signal corresponding to the intake air pressure of the engine from the intake air pressure sensor 33 provided in the engine intake manifold, a signal corresponding to the engine rotational speed from the rotational speed sensor 35 arranged near the engine crank shaft (not shown), and a signal representing the amount the accelerator pedal is depressed (accelerator opening degree), by a driver, from an accelerator opening-degree sensor 37 arranged near the accelerator pedal (not shown) of the engine 1, as well as the air-fuel ratios of the exhaust gases from the cylinders #1, #4 and #2, #3 as detected by the upstream air-fuel ratio sensors 29a, 29b, and an air-fuel ratio of the exhaust gas at the outlet of the NOx occluding and reducing catalyst 7 from the downstream air-fuel ratio sensor 31.

In this embodiment, the ECU 30 calculates the flow rate of the air taken in by the engine 1 based on the engine intake air pressure detected by the intake air pressure sensor 33 and the engine rotational speed detected by the rotational speed sensor 35, and controls the amount of fuel injection during the operation at the stoichiometric air-fuel ratio of the engine or at a rich air-fuel ratio.

Further, the ECU 30 controls the amount of fuel injection during the operation at a lean air-fuel ratio of the engine based on the accelerator opening degree detected by the accelerator opening-degree sensor 37 and the rotational seed of the engine.

The output ports of the ECU 30 are connected to the direct injectors 11 and the port injectors 13 of the cylinders through a fuel injection circuit that is not shown.

The fuel injection control can be executed by using any known control method and, therefore, is not described here in detail.

Next, described below is the NOx occluding and reducing catalyst 7 according to this embodiment.

The NOx occluding and reducing catalyst 7 of this embodiment comprises a substrate such as of cordierite formed in, for example, a honeycomb shape, the surface of the substrate being coated with alumina. The alumina layer carries at least one component selected from alkali metals such as potassium K, sodium Na, lithium Li and cesium Cs, alkaline earth metals such as barium Ba and calcium Ca, and rare earth elements such as lanthanum La, cerium Ce and yttrium Y, as well as a noble metal such as platinum Pt. The NOx occluding and reducing catalyst carries out the absorbing and releasing action, occluding the NOx ($NO_2$, NO) in the exhaust gas by absorption, adsorption or both when the air-fuel ratio of the exhaust gas flowing in is lean, and releasing the NOx which it has occluded in the form of $NO_2$ when the oxygen concentration decreases in the exhaust gas flowing in.

For example, when the engine 1 is in operation at a lean air-fuel ratio and the exhaust gas flowing into the NOx occluding and reducing catalyst 7 has a lean air-fuel ratio, the NOx (NO, $NO_2$) in the exhaust gas are occluded by the NOx occluding and reducing catalyst 7, and the NOx concentration becomes almost zero in the exhaust gas that has passed through the NOx occluding and reducing catalyst 7.

Further, when the oxygen concentration largely decreases in the exhaust gas that is flowing in (i.e., when the air-fuel ratio of the exhaust gas becomes the stoichiometric air-fuel ratio or a rich air-fuel ratio), the NOx occluded in the NOx occluding and reducing catalyst 7 are reduced with the components that work as reducing agents, such as CO and $H_2$ and with HC components (hereinafter referred to as reducing components) in the exhaust gas, and are released from the NOx occluding and reducing catalyst 7 in the form of $NO_2$.

In this embodiment, the ECU 30 operates the engine 1 at a rich air-fuel ratio for a short period of time every time when the amount of NOx occluded in the NOx occluding and reducing catalyst 7 reaches a predetermined value, and executes the rich spike operation for supplying the exhaust gas of a rich air-fuel ratio to the NOx occluding and reducing catalyst. Therefore, NOx occluded in the NOx occluding and reducing catalyst 7 is released therefrom in the form of $NO_2$, and the NOx occluding and reducing catalyst is prevented from being saturated with the NOx which it has absorbed.

A timing for starting the rich spike operation in this embodiment, i.e., a moment when the amount of NOx occluded in the NOx occluding and reducing catalyst 7 has reached the predetermined value, can be judged by any known method which, therefore, is not described here in detail.

In this embodiment, the outputs of the upstream air-fuel ratio sensors 29a, 29b and the downstream air-fuel ratio sensor 31 are used for controlling the air-fuel ratio to control the amount of supplying the fuel to the engine 1 by feedback, so that the operating air-fuel ratio of the engine 1 becomes a predetermined target air-fuel ratio. Further, the output of the downstream air-fuel ratio sensor 31 is used for judging the moment the rich spike operation is terminated as will be described later.

Next, described below are the operation modes of the engine 1 according to the embodiment.

Figure 2:
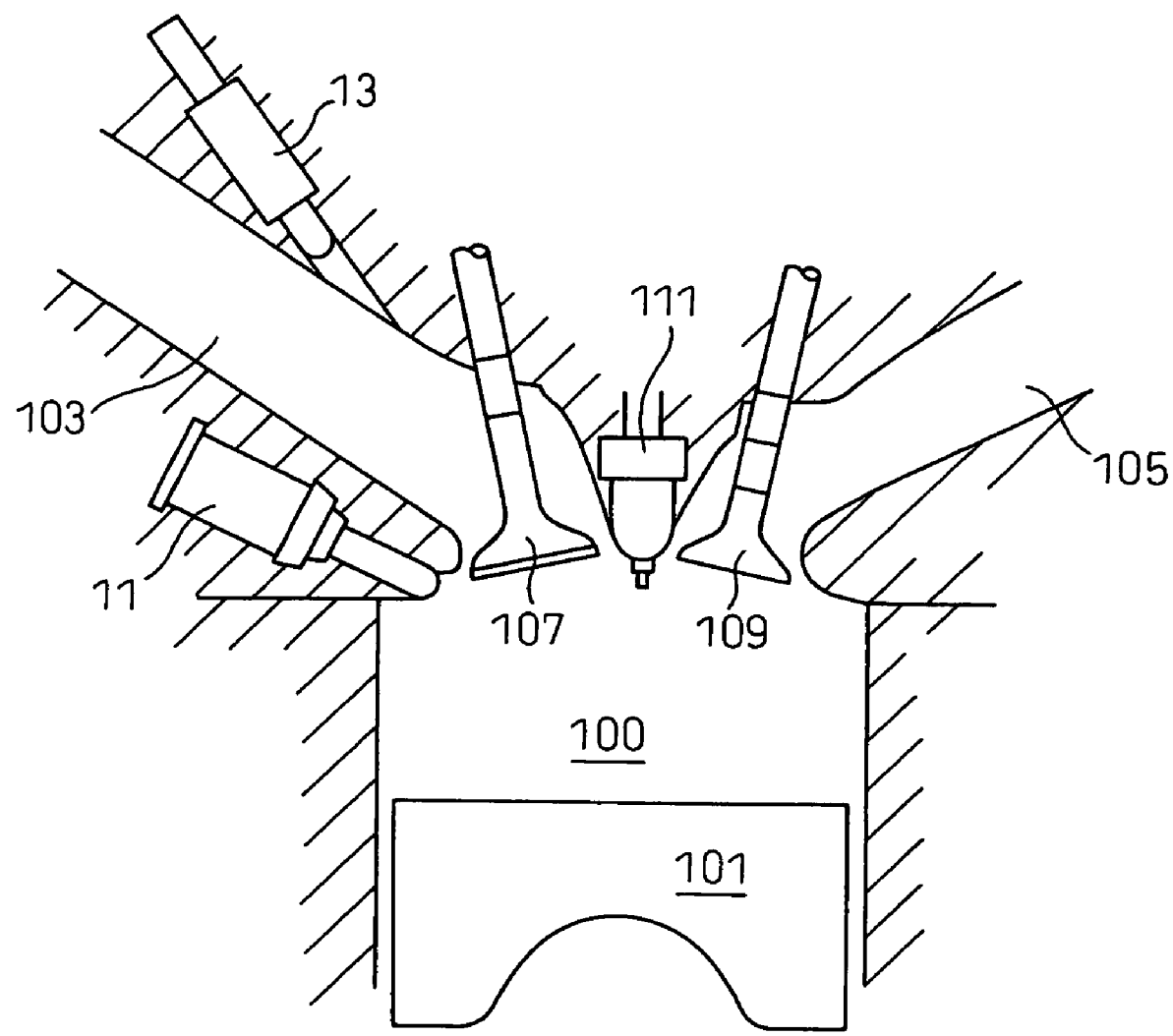
FIG. 2 is a diagram illustrating an arrangement of a direct injector and a port injector.

FIG. 2 is a sectional view of a cylinder illustrating the arrangement of the injectors 11 and 13 in each of the cylinders of the engine 1 in the embodiment.

In FIG. 2, reference numeral 100 denotes a cylinder combustion chamber, 101 denotes a piston, 103 denotes an intake port, 105 denotes an exhaust port, 107 denotes an intake valve, 109 denotes an exhaust valve, and 111 denotes a spark plug.

Referring to FIG. 2, the port injector 13 is arranged in the intake manifold 4 and injects the fuel into the intake port of each cylinder. The direct injector 11 has an injection port opening in the combustion chamber 100 of the engine and injects the fuel directly into the cylinder.

In this embodiment, the engine 1 can be operated over a wide range of air-fuel ratios of from a lean air-fuel ratio through up to a rich air-fuel ratio. When operating at a lean air-fuel ratio, the direct injector 11 and the port injector 13 are used in a manner as described below depending upon the operation modes of the engine.

That is, when operating at a small load and at a lean air-fuel ratio, the engine 1 is operated in a stratified charge combustion mode with the fuel being injected from the direct injector.

In the stratified charge combustion mode, the fuel is injected from the direct injector 11 in the latter half of the compression stroke. In the stratified charge combustion mode, the fuel is injected in a considerably small amount. Therefore, if the fuel is homogeneously diffused in the whole combustion chamber, the air-fuel ratio of the mixture becomes too lean and lies out of the combustible air-fuel ratio. In the stratified charge combustion mode, therefore, the fuel is injected from the direct injector in the latter half of the compression stroke to form a stratified layer of injected fuel near the spark plug, i.e., to form a mixture in a range of combustible air-fuel ratios near the spark plug. The spark plug effects the ignition before the stratified charge mixture diffuses so that a stable combustion takes place in the combustion chamber as a whole at a very lean air-fuel ratio.

When the load has further increased during the operation at a lean air-fuel ratio, the engine is operated in a uniform charge combustion mode.

In the uniform charge combustion mode, the fuel is injected into the intake port from the port injector 13. When the intake valve 107 is opened, the fuel injected into the intake port 1 flows into the combustion chamber in a state of being sufficiently mixed with the intake air, and forms a uniform combustible mixture of a lean air-fuel ratio in the combustion chamber. Therefore, the operation is conducted at a lean air-fuel ratio at a relatively large load.

In an intermediate load range between the uniform charge combustion mode and the stratified charge combustion, the fuel is injected from both injectors, i.e., from the port injector and the direct injector, and the operation is conducted in an intermediate mode forming a stratified layer of a mixture by the injection of fuel from the direct injector in a lean and uniform mixture that is formed by the injection of fuel from the port injector.

In the supercharged lean burn engine as described above, however, the cylinders are filled with the air of a large amount due to the supercharging in a region where the load is relatively large, and the amount of exhaust gas increases.

In the supercharged lean burn engine, therefore, the space velocity of exhaust gas through the NOx occluding and reducing catalyst 7 becomes large during the rich spike operation, and the NOx reduction efficiency decreases due to the above-mentioned blow-by and the rich spike operation terminates in an insufficient state due to incorrect detection of the air-fuel ratio by the downstream air-fuel ratio sensor.

This embodiment solves the above-mentioned problems by varying the engine operating air-fuel ratio during the rich spike operation in accordance with the supercharged pressure (in a range of rich air-fuel ratios) or, if described in further detail, by setting the air-fuel ratio to be high (by setting the richness degree to be small) with an increase in the supercharged pressure.

That is, the space velocity of exhaust gas passing through the NOx occluding and reducing catalyst 7 during the rich spike operation increases with an increase in the engine exhaust gas flow speed. Therefore, the amounts of the reducing components which flows through the NOx occluding and reducing catalyst due to blow-by without being used for reducing the NOx on the NOx occluding and reducing catalyst increase.

The amount of the reducing components (HC, CO) passing through the NOx occluding and reducing catalyst, due to blow-by, increases with an increase in the exhaust gas flow speed or with an increase in the amounts of HC and CO contained in the exhaust gas, i.e., with an increase in the richness degree of the exhaust gas (engine operating air-fuel ratio) during the rich spike operation.

If the richness degree of air-fuel ratio during the rich spike operation is lowered, the amounts of HC and CO contained in the exhaust gas decrease, and the amounts of HC and CO released to the downstream passing through the NOx occluding and reducing catalyst decrease correspondingly.

In the region of increased amounts of the air taken in where the blow-by becomes a problem, therefore, this embodiment solves the problem by decreasing the richness degree of air-fuel ratio during the rich spike operation with an increase in the amount of the air taken in.

That is, upon decreasing the richness degree of air-fuel ratio during the rich spike operation with an increase in the amount of the air taken in, it becomes possible to prevent an increase in the amount of HC and CO passing through the NOx occluding and reducing catalyst due to blow-by and, therefore, it becomes possible to decrease the amounts of HC and CO that flow to the downstream of the catalyst without being used for reducing NOx on the NOx occluding and reducing catalyst and to suppress a decrease in the NOx reduction efficiency of the NOx occluding and reducing catalyst during the rich spike operation. Further, this suppresses an increase in the HC and CO concentrations in the exhaust gas on the downstream side preventing such an occurrence that the rich spike operation is interrupted due to a rich air-fuel ratio detected by the air-fuel ratio sensor though the air-fuel ratio on the downstream side is not really changing into a rich air-fuel ratio.

Figure 3:
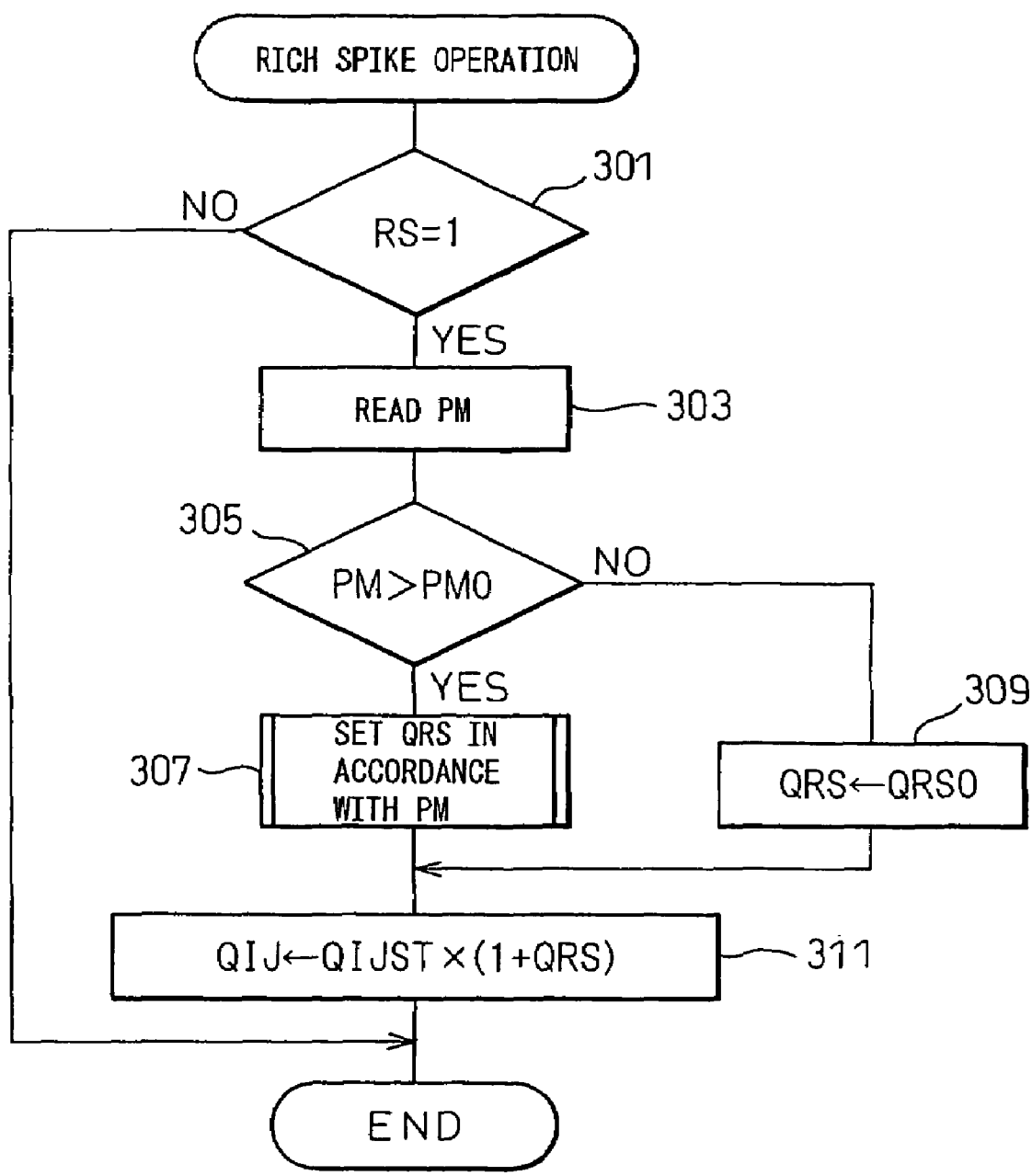
FIG. 3 is a flowchart illustrating a rich spike operation according to the present invention.

FIG. 3 is a flowchart illustrating the detail of the above-mentioned rich spike operation in the present embodiment.

The operation of FIG. 3 is carried out by a routine executed by the ECU 30 at regular intervals.

When the operation of FIG. 3 starts, it is judged at step 301, first, if the value of a rich spike operation execution flag RS is set to 1.

The flag RS is the one that is set in a rich spike execution-judging operation which is separately executed by the ECU 30, and RS=1 stands for that the rich spike operation is being executed.

In this embodiment, the ECU 30 sets the value of flag RS to 1 when the amount of NOx occluded in the NOx occluding and reducing catalyst 7 increases up to a predetermined upper-limit value, and sets the value of flag RS to 0 when the exhaust gas air-fuel ratio detected by the downstream air-fuel ratio sensor 31 changes from a lean air-fuel ratio to a rich air-fuel ratio while the rich spike operation (steps 303 to 315) of FIG. 3 is being executed.

When the value of RS is set to 1 in this embodiment, the amount of fuel injection is set at step 311 to a value with which the engine air-fuel ratio becomes a rich air-fuel ratio, and the whole amount of fuel is injected from the port injector 13. Therefore, the fuel is favorably atomized and diffused to establish a favorably combusting state. During the rich spike operation, therefore, the HC and CO components are prevented from being generated in increased amounts.

In this embodiment, the amount of NOx occluded in the NOx occluding and reducing catalyst 7 can be estimated by any known method and is not described here in detail.

When RS=0 at step 301, NOx is now being occluded little in the NOx occluding and reducing catalyst, and the rich spike operation does not need to be executed. Therefore, the routine executed this time ends.

When RS=1 at step 301, on the other hand, NOx is occluded in an increased amount in the NOx occluding and reducing catalyst, and the rich spike operation is executed at steps 303 to 315.

That is, at step 303, the engine intake air pressure (i.e., supercharged pressure) is read from the intake air pressure sensor 33 and at step 305, it is judged whether the engine supercharged pressure is higher than a predetermined judging value PM0.

PM0 is an upper-limit value of the supercharged pressure that does not cause a problem of blow-by at the time of rich spiking when a value of increment coefficient that will be described later is set to be a predetermined constant value QRS0. The value PM0 varies depending upon the model of the engine, model of the catalyst and size thereof, and should desirably be set based on the experimental results by actually using the engine and the catalyst.

When PM≦PM0 at step 305, the supercharged pressure is low, the flow rate of the exhaust gas is relatively small, and no blow-by occurs. Therefore, the HC and CO components do not flow out in large amounts to the downstream of the catalyst. In this case, therefore, the routine proceeds to step 309 where the increment coefficient QRS is set to a predetermined fixed value QRS0.

In this embodiment, when the increment coefficient QRS is determined, the fuel injection amount QIJ of the engine is determined at step 311 as QIJ=QIJST×(1+QRS). QIJST is the fuel injection amount necessary for setting the air-fuel ratio of the engine to be the stoichiometric air-fuel ratio. Therefore, the increment coefficient QRS (QRS≧0) is a coefficient representing an excess amount of fuel, i.e., a richness degree of the air-fuel ratio.

When the supercharged pressure is PM≦PM0 and the flow rate of the exhaust gas is relatively small as described above, the value QRS is set to be a constant value QRS0 (which provides a large richness degree) which is larger than the value QRS set at step 307 that will be described later.

When PM>PM0 at step 305, on the other hand, a value of increment coefficient QRS is set in accordance with a value of supercharged pressure PM at step 307.

Figure 4:
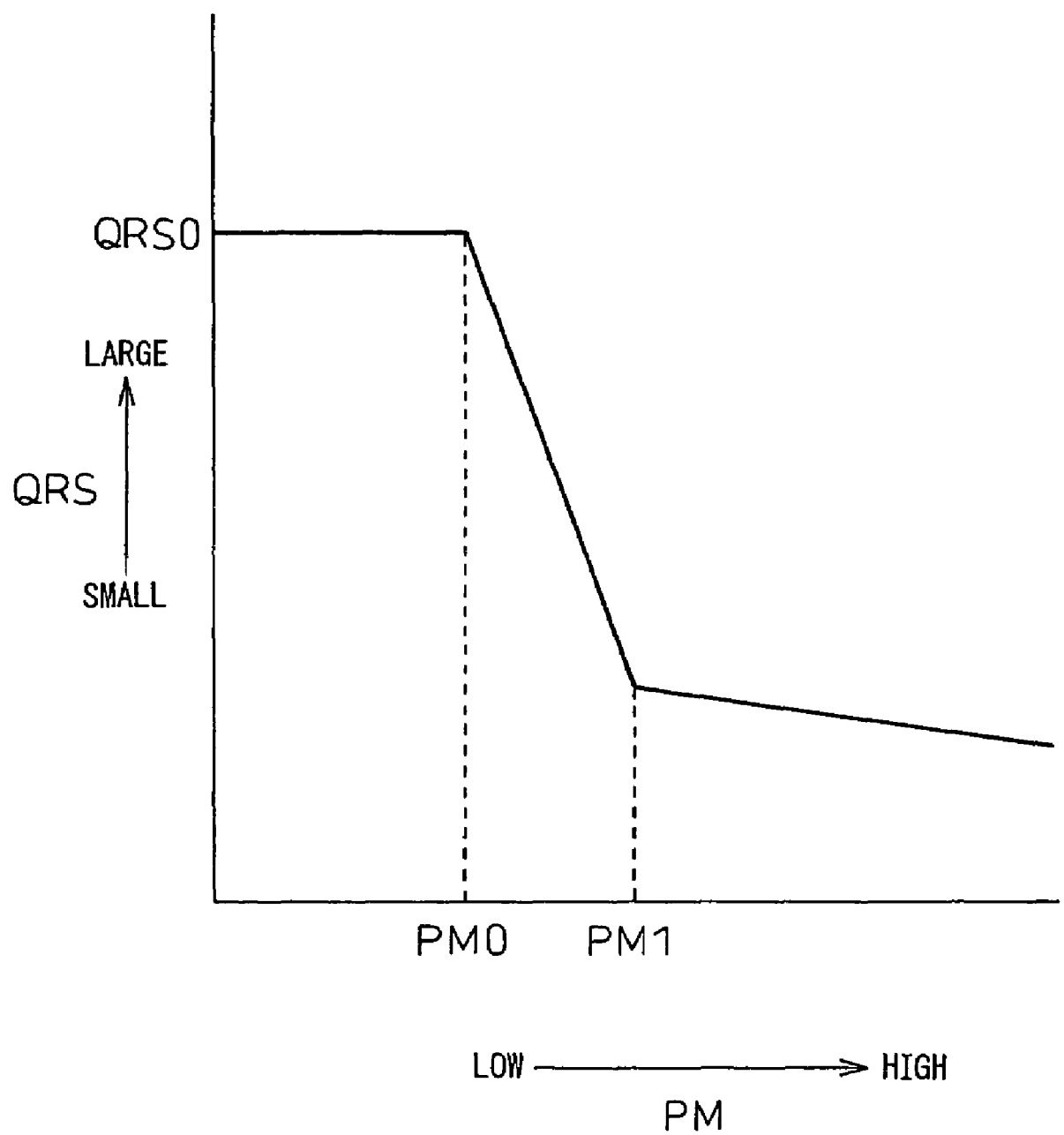
FIG. 4 is a diagram illustrating how to set a richness degree of the air-fuel ratio during the rich spike operation in accordance with the supercharged pressure.

FIG. 4 is a diagram illustrating a relationship between the value QRS set at step 307 and the supercharged pressure PM. Referring to FIG. 4, a value of the increment coefficient QRS is set to be a constant value QRS0 when the supercharged pressure PM is smaller than PM0 (step 309). When the supercharged pressure PM becomes larger than PM0, however, the increment coefficient QRS is set to a value that sharply decreases with an increase in the supercharged pressure. In this embodiment, as the supercharged pressure further increases to exceed a given value PM1 (FIG. 4), QRS decreases mildly.

As described above, upon so setting the value (richness degree) QRS as to decrease with an increase in the supercharged pressure in the region where the problem occurs due to blow-by, it is made possible to prevent a decrease in the NOx reduction efficiency of the NOx occluding and reducing catalyst during the rich spike operation and to prevent the rich spike operation from terminating before the occluded amount of NOx reaches the predetermined lower-limit value.

Next, another embodiment of the invention will be described below with reference to FIG. 5.

In this embodiment, the amount of fuel injection during the rich spike operation is set in accordance with the supercharged pressure like in the embodiment of FIG. 3. When the supercharged pressure exceeds the predetermined value PM0, however, this embodiment becomes different from the embodiment of FIG. 3 with respect to that the timing for injecting the fuel from the port injector 13 is changed from the intake-asynchronous injection (step 513) over to the intake-synchronous injection (step 509).

That is, when the supercharged pressure becomes higher than the judging value PM0 at step 505, QRS at step 507 is set in accordance with a value of the supercharged pressure based on a relationship of FIG. 4, and a value of a synchronous injection flag XSYNC is set to 1 at step 509. In the operation for setting a fuel injection timing separately executed by the ECU 30, therefore, the timing for injecting the fuel is set to be the intake-synchronous injection.

Further, when PM≦PM0 at step 505, the value QRS is set to be the constant value QRS0, the value of the flag XSYNC is set to 0, and the fuel injection timing is set to be the intake-asynchronous injection.

By executing the intake-synchronous injection during the rich spike operation, the fuel due to port-wet phenomenon adheres little on the wall surface of the intake port, and a delay in increasing the amount of fuel is prevented in really supplying the fuel into the combustion chamber during the rich spike operation, preventing a decrease in the response of change in the air-fuel ratio.

In this embodiment, the supercharged pressure-judging value (PM0) for changing the method of setting the increment coefficient is the same as the supercharged pressure-judging value for changing the fuel injection timing. These values, however, may be different from each other.

Figure 5:
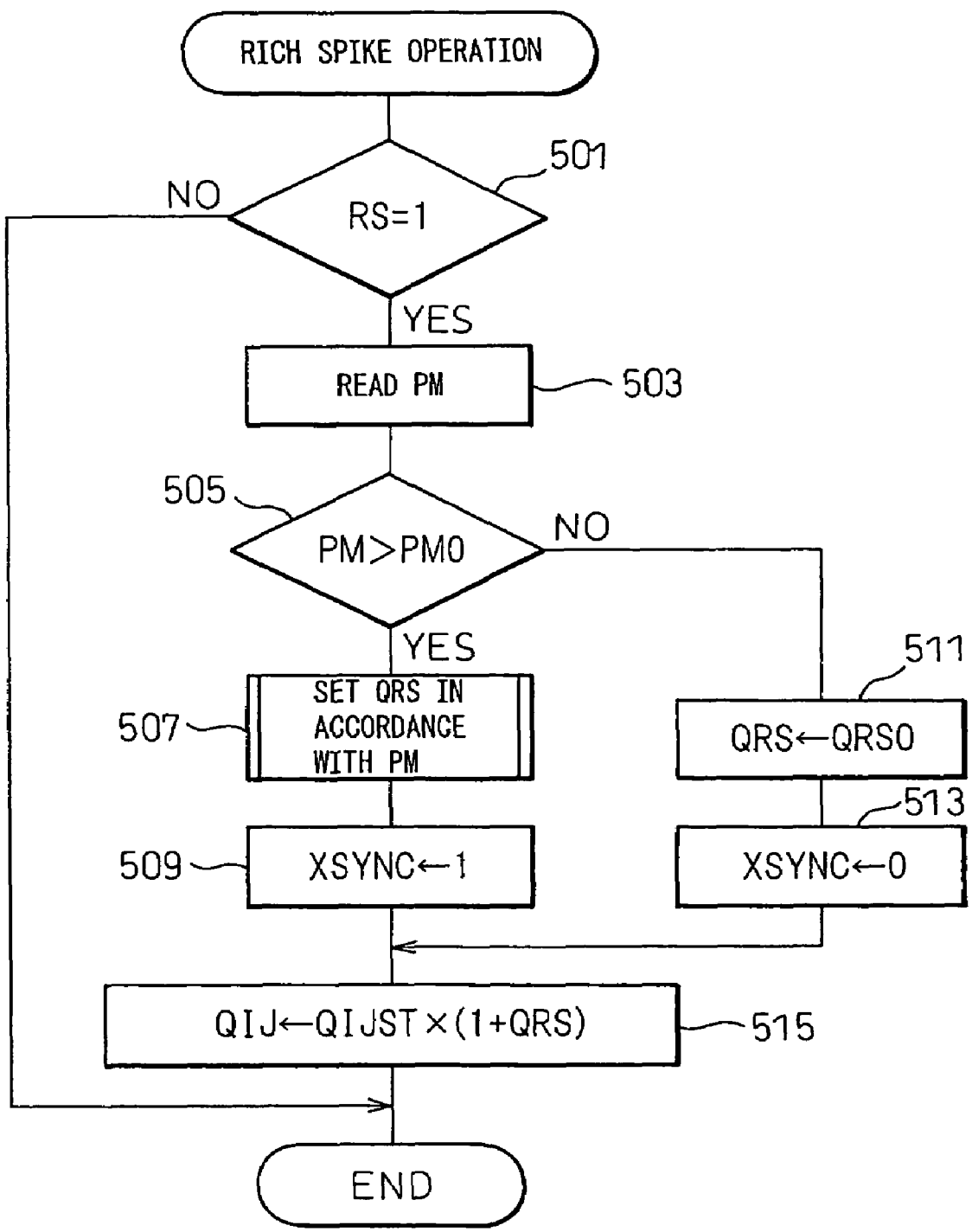
FIG. 5 is a flowchart illustrating another rich spike operation.

Further, the embodiments of FIGS. 3 and 5 use the supercharged pressure as an index for representing the flow rate of the exhaust gas. Instead of using the supercharged pressure, however, it is also allowable to use the amount of the air GA taken in by the engine as an index for representing the flow rate of the exhaust gas.

In this embodiment as described above, the ECU 30 calculates the amount of the air taken in by the engine relying upon the intake air pressure (supercharged pressure) detected by the intake air pressure sensor 33 and upon the engine rotational speed detected by the rotational speed sensor 35 in order to calculate the amount of injecting the fuel into the engine. It is, therefore, allowed to execute quite the same operations as those of FIGS. 3 and 5 by using the amount GA of the air taken in instead of using the supercharged pressure PM.

In this case, at steps 303, 503 in the real flowcharts of FIGS. 3 and 5, the separately calculated amount GA of the air taken in is read and at steps 305, 505, the increment coefficient and the fuel injection timing are set depending upon whether GA is larger than a predetermined judging value GA0.

Figure 6:
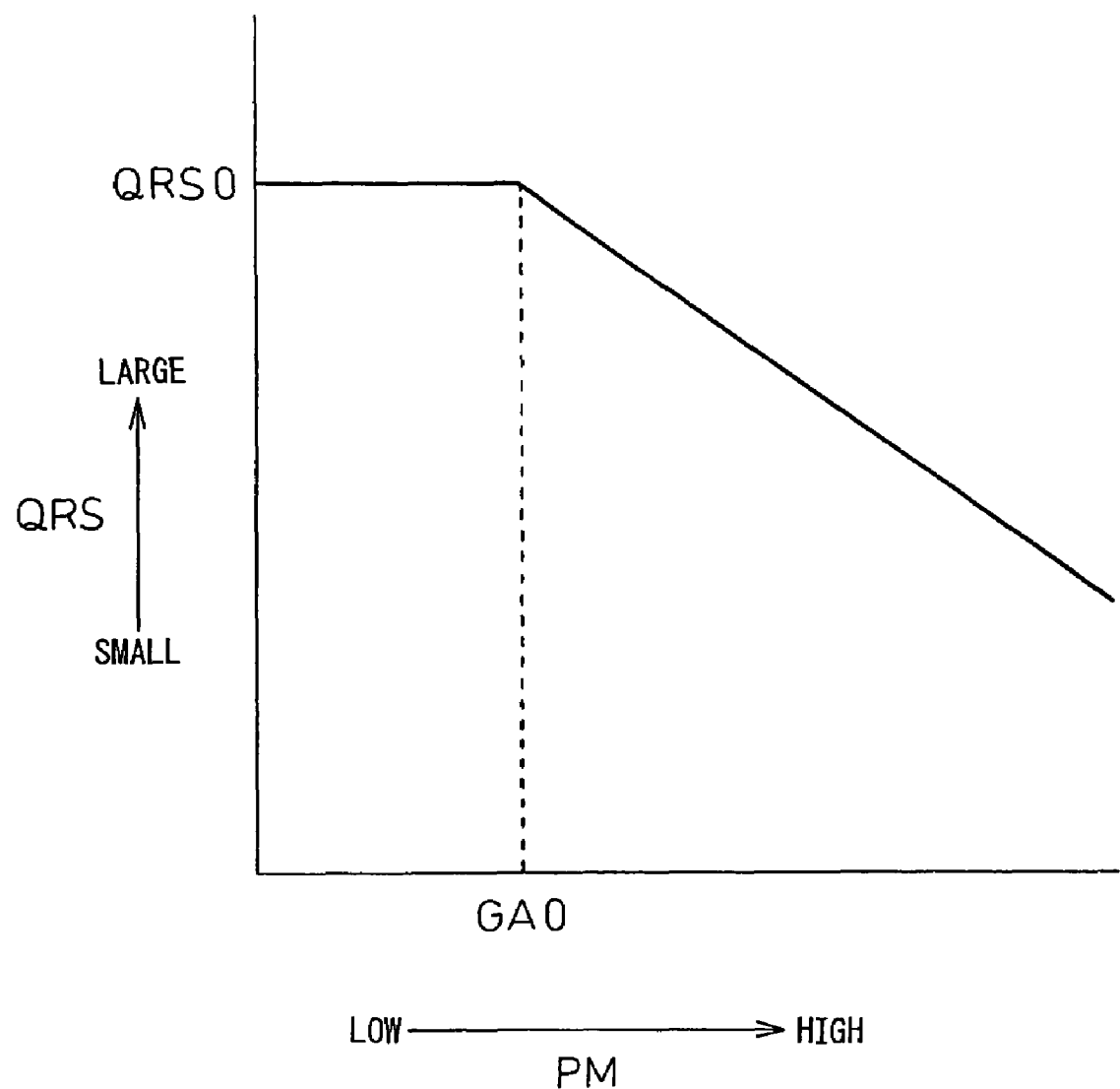
FIG. 6 is a diagram illustrating how to set a richness degree of the air-fuel ratio during the rich spike operation in accordance with the amount of the air taken in by the engine.

FIG. 6 is a diagram like that of FIG. 4 and illustrates a relationship between the value QRS that is set in this case and the amount GA of the air taken in. In the embodiment of FIG. 6, the value QRS is set to a constant value QRS0 in a region where the value GA is smaller than GA0, and is set to linearly decrease with an increase in GA in the region where the value GA is larger than GA0.

Upon changing the richness degree (QRS) of the air-fuel ratio during the rich spike operation in accordance with the amount GA of the air taken in, the richness degree of the air-fuel ratio can be changed during the rich spike operation in accordance with the flow rate of the exhaust gas maintaining precision. It does not need to be pointed out that the same control can be carried out even by using the amount of the air really filled in the cylinders (amount of the air filling the cylinders) instead of using the amount GA of the air taken in.

In the above embodiments, the supercharged pressure or the amount of the air taken in (or amount of the air filling the cylinders) is used as an index for representing the flow rate of the exhaust gas. Instead of using these indexes, however, the flow rate of the exhaust gas may be used to conduct the operations of FIGS. 3 to 5. In this case, the flow rate of the exhaust gas may be directly measured by disposing a flow rate sensor in the exhaust gas system. However, the flow rate of the exhaust gas is determined depending upon the operation conditions of the engine (e.g., engine rotational speed, fuel injection amount, etc.). Therefore, the flow rate of the exhaust gas may be calculated from the engine rotational speed and the fuel injection amount of when practically driving by measuring, in advance, the flow rate of the exhaust gas by really using an engine while varying the engine operating conditions, and by storing the engine rotational speeds and fuel injection amounts as parameters in the ROM in the ECU in the form of a numerical map.

In the embodiments of FIGS. 3 and 5, further, the richness degree in the air-fuel ratio varies in accordance with a change in the flow rate of the exhaust gas or with a change in the index representing the flow rate of the exhaust gas (hereinafter referred to as "flow rate of the exhaust gas, etc.") even during the rich spike operation. In practice, however, the rich spike operation lasts for only a relatively short period of time. Therefore, the richness degree of air-fuel ratio may be set by the method described above with reference to FIGS. 3 to 6 in accordance with the flow rate of the exhaust gas, etc. at the start of the rich spike operation, and may be fixed to the thus set value while the rich spike operation is being executed.

The embodiments of FIGS. 3 to 6 have explained the cases of using a supercharged lean burn engine. As described earlier, however, the same problem could occur not only in the supercharged lean burn engines but also in the naturally aspirated lean burn engines when the flow rate of the exhaust gas (space velocity in the catalyst) is large.

In the naturally aspirated lean burn engine too, therefore, the operation may be conducted in the same manner as described with reference to FIGS. 3 to 6 in order to vary the richness degree of air-fuel ratio at the time of rich spike operation in accordance with the flow rate of the exhaust gas or to set the richness degree of air-fuel ratio during the rich spike operation in accordance with a value such as of the flow rate of the exhaust gas at the start of the rich spike operation in order to prevent a decrease in the NOx reduction efficiency. The operation in this case is the same as the one described with reference to FIGS. 3 to 6, and is not described here again in detail.

LIST OF REFERENCE NUMERALS

1—engine body
2—exhaust gas passage
4—intake air passage
7—NOx occluding and reducing catalyst
11—direct injectors
13—port injectors
29a, 29b—upstream air-fuel ratio sensors
30—ECU (electronic control unit)
31—downstream air-fuel ratio sensor
33—intake air pressure sensor
45—supercharger

The invention claimed is:

1. A device for purifying exhaust gas of an internal combustion engine which is equipped with a supercharger and effects the supercharging in the operation at a lean air-fuel ratio, comprising:
  a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;
  wherein when the engine is in operation at a lean air-fuel ratio, a rich spike operation is executed by changing the engine operating air-fuel ratio over to a rich air-fuel ratio for a short period of time to supply the exhaust gas of the rich air-fuel ratio to the NOx occluding and reducing catalyst, in order to reduce and purify the NOx occluded by the NOx occluding and reducing catalyst; and
  wherein, when the supercharged pressure of the engine becomes higher than a preset value at which blow-by occurs at the NOx occluding and reducing catalyst, the richness degree of the engine operating air-fuel ratio during the rich spike operation is controlled in accordance with the supercharged pressure of the engine.

2. A device for purifying exhaust gas of an internal combustion engine which is equipped with a supercharger and effects the supercharging in the operation at a lean air-fuel ratio, comprising:
  a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;
  wherein, when the engine is in operation at a lean air-fuel ratio, a rich spike operation is executed by changing the engine operating air-fuel ratio over to a rich air-fuel ratio for a short period of time to supply the exhaust gas of the rich air-fuel ratio to the NOx occluding and reducing catalyst, in order to reduce and purify the NOx occluded by the NOx occluding and reducing catalyst; and wherein, when the supercharged pressure of the engine becomes higher than a preset value at which blow-by occurs at the NOx occluding and reducing catalyst, the richness degree of the engine operating air-fuel ratio during the rich spike operation is controlled in accordance with the supercharged pressure of the engine at the start of the rich spike operation.

3. A device for purifying exhaust gas of an internal combustion engine according to claim 1, wherein, in controlling the richness degree in accordance with the supercharged pressure, the richness degree is controlled to decrease with an increase in the supercharged pressure.

4. A device for purifying exhaust gas of an internal combustion engine according to claim 1, wherein said internal combustion engine is equipped with direct injectors for directly injecting the fuel into the cylinders and port injectors for injecting the fuel into the intake air passage, and during the rich spike operation, the fuel is injected from the port injectors only and, when the supercharged pressure becomes higher than a preset change-over value, the fuel injection from the port injectors is controlled to change from the asynchronous injection to the synchronous injection.

5. A device for purifying exhaust gas of an internal combustion engine which is equipped with a supercharger and effects the supercharging in the operation at a lean air-fuel ratio, comprising:
 a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;
 wherein when the engine is in operation at a lean air-fuel ratio, a rich spike operation is executed by controlling the engine operating air-fuel ratio to change to a rich air-fuel ratio for a short period of time to supply the exhaust gas of the rich air-fuel ratio to the NOx occluding and reducing catalyst, in order to reduce and purify the NOx occluded by the NOx occluding and reducing catalyst; and
 wherein, when the flow rate of the air taken in by the engine becomes larger than a preset value at which blow-by occurs at the NOx occluding and reducing catalyst, the richness degree of the engine operating air-fuel ratio during the rich spike operation is controlled in accordance with the flow rate of the air taken in by the engine.

6. A device for purifying exhaust gas of an internal combustion engine which is equipped with a supercharger and effects the supercharging in the operation at a lean air-fuel ratio, comprising:
 a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;
 wherein when the engine is in operation at a lean air-fuel ratio, a rich spike operation is executed by controlling the engine operating air-fuel ratio to change to a rich air-fuel ratio for a short period of time to supply the exhaust gas of the rich air-fuel ratio to the NOx occluding and reducing catalyst, in order to reduce and purify the NOx occluded by the NOx occluding and reducing catalyst; and
 wherein, when the flow rate of the air taken in by the engine becomes larger than a preset value at which blow-by occurs at the NOx occluding and reducing catalyst, the richness degree of the engine operating air-fuel ratio during the rich spike operation is controlled in accordance with the flow rate of the air taken in by the engine at the start of the rich spike operation.

7. A device for purifying exhaust gas of an internal combustion engine according to claim 5, wherein, in controlling the richness degree in accordance with the amount of the air taken in, the richness degree is controlled to decrease with an increase in the amount of the air taken in.

8. A device for purifying exhaust gas of an internal combustion engine according to claim 5, wherein said internal combustion engine is equipped with direct injectors for directly injecting the fuel into the cylinders and port injectors for injecting the fuel into the intake air passage, and during the rich spike operation, the fuel is injected from the port injectors only and, when the amount of the air taken in becomes larger than a preset change-over value, the fuel injection from the port injectors is controlled to change from the asynchronous injection to the synchronous injection.

9. A device for purifying exhaust gas of an internal combustion engine which can be operated at a lean air-fuel ratio, comprising:
 a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;
 wherein when the engine is in operation at a lean air-fuel ratio, a rich spike operation is executed by controlling the engine operating air-fuel ratio to change to a rich air-fuel ratio for a short period of time to supply the exhaust gas of the rich air-fuel ratio to the NOx occluding and reducing catalyst to reduce and purify the NOx occluded by the NOx occluding and reducing catalyst; and
 wherein, when the flow rate of the exhaust gas of the engine becomes larger than a preset value at which blow-by occurs at the NOx occluding and reducing catalyst, the richness degree of the engine operating air-fuel ratio during the rich spike operation is controlled in accordance with the flow rate of the exhaust gas of the engine.

10. A device for purifying exhaust gas of an internal combustion engine which can be operated at a lean air-fuel ratio, comprising:
 a NOx occluding and reducing catalyst which is arranged in the exhaust gas passage of the engine, occludes the NOx in the exhaust gas by absorption, adsorption or both when the exhaust gas flowing in has a lean air-fuel ratio, and reduces and purifies the occluded NOx when the exhaust gas flowing in has the stoichiometric air-fuel ratio or a rich air-fuel ratio;
 wherein when the engine is in operation at a lean air-fuel ratio, a rich spike operation is executed by controlling the engine operating air-fuel ratio to change to a rich air-fuel ratio for a short period of time to supply the exhaust gas of the rich air-fuel ratio to the NOx occluding and reducing catalyst, in order to reduce and purify the NOx occluded by the NOx occluding and reducing catalyst; and
 wherein, when the flow rate of the exhaust gas of the engine becomes larger than a preset value at which blow-by occurs at the NOx occluding and reducing catalyst, the richness degree of the engine operating air-fuel ratio during the rich spike operation is controlled in accordance with the flow rate of the exhaust gas of the engine at the start of the rich spike operation.

11. A device for purifying exhaust gas of an internal combustion engine according to claim 9, wherein, in controlling the richness degree in accordance with the flow rate of the exhaust gas, the richness degree is controlled to decrease with an increase in the flow rate of the exhaust gas.

12. A device for purifying exhaust gas of an internal combustion engine according to claim 9, wherein said internal combustion engine is equipped with direct injectors for directly injecting the fuel into the cylinders and port injectors for injecting the fuel into the intake air passage, and during the rich spike operation, the fuel is injected from the port injectors only and, when the flow rate of the exhaust gas becomes larger than a preset change-over value, the fuel injection from the port injectors is controlled to change from the asynchronous injection to the synchronous injection.

13. A device for purifying exhaust gas of an internal combustion engine according to claim 2, wherein, in controlling the richness degree in accordance with the supercharged pressure, the richness degree is controlled to decrease with an increase in the supercharged pressure.

14. A device for purifying exhaust gas of an internal combustion engine according to claim 2, wherein said internal combustion engine is equipped with direct injectors for directly injecting the fuel into the cylinders and port injectors for injecting the fuel into the intake air passage, and during the rich spike operation, the fuel is injected from the port injectors only and, when the supercharged pressure becomes higher than a preset change-over value, the fuel injection from the port injectors is controlled to change from the asynchronous injection over to the synchronous injection.

15. A device for purifying exhaust gas of an internal combustion engine according to claim 6, wherein, in controlling the richness degree in accordance with the amount of the air taken in, the richness degree is controlled to decrease with an increase in the amount of the air taken in.

16. A device for purifying exhaust gas of an internal combustion engine according to claim 6, wherein said internal combustion engine is equipped with direct injectors for directly injecting the fuel into the cylinders and port injectors for injecting the fuel into the intake air passage, and during the rich spike operation, the fuel is injected from the port injectors only and, when the amount of the air taken in becomes larger than a preset change-over value, the fuel injection from the port injectors is controlled to change from the asynchronous injection to the synchronous injection.

17. A device for purifying exhaust gas of an internal combustion engine according to claim 10, wherein, in controlling the richness degree in accordance with the flow rate of the exhaust gas, the richness degree is controlled to decrease with an increase in the flow rate of the exhaust gas.

18. A device for purifying exhaust gas of an internal combustion engine according to claim 10, wherein said internal combustion engine is equipped with direct injectors for directly injecting the fuel into the cylinders and port injectors for injecting the fuel into the intake air passage, and during the rich spike operation, the fuel is injected from the port injectors only and, when the flow rate of the exhaust gas becomes larger than a preset change-over value, the fuel injection from the port injectors is controlled to change from the asynchronous injection to the synchronous injection.

19. A device for purifying exhaust gas of an internal combustion engine according to claim 1, wherein:
   a flow rate of air taken in by the engine is detected by an intake air pressure sensor and an engine rotational speed is detected by a rotational speed sensor, and
   a control unit controls the amount of fuel injected during the rich spike operation based on values detected by the intake air pressure sensor and the rotational speed sensor.

20. A device for purifying exhaust gas of an internal combustion engine according to claim 2, wherein:
   a flow rate of air taken in by the engine is detected by an intake air pressure sensor and an engine rotational speed is detected by a rotational speed sensor, and
   a control unit controls the amount of fuel injected during the rich spike operation based on values detected by the intake air pressure sensor and the rotational speed sensor.

21. A device for purifying exhaust gas of an internal combustion engine according to claim 5, wherein:
   a flow rate of air taken in by the engine is detected by an intake air pressure sensor and an engine rotational speed is detected by a rotational speed sensor, and
   a control unit controls the amount of fuel injected during the rich spike operation based on values detected by the intake air pressure sensor and the rotational speed sensor.

22. A device for purifying exhaust gas of an internal combustion engine according to claim 6, wherein:
   a flow rate of air taken in by the engine is detected by an intake air pressure sensor and an engine rotational speed is detected by a rotational speed sensor, and
   a control unit controls the amount of fuel injected during the rich spike operation based on values detected by the intake air pressure sensor and the rotational speed sensor.

23. A device for purifying exhaust gas of an internal combustion engine according to claim 9, wherein:
   a flow rate of air taken in by the engine is detected by an intake air pressure sensor and an engine rotational speed is detected by a rotational speed sensor, and
   a control unit controls the amount of fuel injected during the rich spike operation based on values detected by the intake air pressure sensor and the rotational speed sensor.

24. A device for purifying exhaust gas of an internal combustion engine according to claim 10, wherein:
   a flow rate of air taken in by the engine is detected by an intake air pressure sensor and an engine rotational speed is detected by a rotational speed sensor, and
   a control unit controls the amount of fuel injected during the rich spike operation based on values detected by the intake air pressure sensor and the rotational speed sensor.

* * * * *